Patented Feb. 28, 1928.

1,660,826

UNITED STATES PATENT OFFICE.

ALEXANDER WINOGRADOFF, OF NEW YORK, N. Y., ASSIGNOR TO INECTO, INC., OF NEW YORK, N. Y., A CORPORATION OF DELAWARE.

METHOD OF DYEING FUR.

No Drawing. Application filed April 1, 1926. Serial No. 99,164.

The object of my invention is to dye fur and the like, to produce new and beautiful poly-chromatic effects thereon by treating the same with a silver salt, exposure to light and a reducing agent. The fur pelt and the like, such, for instance, as weasel or ermine for example, is first killed in the usual manner. It is then treated with a silver salt as, for instance, by subjecting the same to a bath containing 1% silver nitrate for any reasonable time, such for instance as ten or fifteen minutes. The pelt is exposed to the light either natural or artificial and of various intensities, either during this treatment with the silver salt or after the treatment, or both. The light need not be intense and may be either a natural light or an artificial light and the exposure may vary in time according to the character and intensity of the light, it being essential that some light be utilized in the treatment of the pelt. The pelt is then finally treated with a reducing agent, as, for instance, by subjecting the same to a bath containing 0.2% paraphenylene diamine.

When the desired colors have been sufficiently developed, as for instance in about ten minutes, the pelt is washed and finished in the usual manner.

I have found that by using a silver salt the fur is dyed in a variety of hues whose characteristic property is a very beautiful poly-chromatic effect.

By this method I am enabled to bring out shades having different ground colors such as blue, purple, green, etc. but the chief characteristic of all of the colors developed is a changing effect depending upon the point of view of the observer, i. e. an opalescent effect.

I am aware that fur has been dyed in baths containing various metals, such as iron, copper, chromium, etc. as mordanting agents, followed by easily oxidized organic compounds to form colored substances directly on the hair so mordanted, but I am not aware that a silver salt has ever been employed for this purpose.

It is to be understood that I do not wish to limit myself to the use of silver nitrate as other silver salts may be used and also that I do not wish to limit myself to the use of paraphenylene diamine as the reducing or developing agent, as other organic or inorganic agents may be used, such, for instance, as photographic developers in general, or even sodium hydrosulfite.

What I claim is:—

1. A process for dyeing fur and the like which consists in treating the same with a silver salt, exposure to light and then with a reducing agent.

2. A process for dyeing fur and the like which consists in subjecting the same to treatment in a bath containing a silver salt, exposing the same to light and subsequently to treatment in a bath containing a reducing agent.

3. A process for dyeing fur and the like which consists in subjecting the same to treatment in a bath containing a silver salt, exposing the same to light and subsequently to treatment in a bath containing an organic reducing agent.

4. A process for dyeing fur and the like which consists in subjecting the same to treatment in a bath containing silver nitrate, exposing the same to light and subsequently to treatment in a bath containing paraphenylenediamine.

5. A process for dyeing fur and the like which consists in subjecting the same to treatment in a bath containing 1% silver nitrate, exposing the same to light and subsequently to treatment in a bath containing 0.2% paraphenylenediamine.

6. A process for dyeing fur and the like which consists in treating the same with a silver salt, exposure to light and with an organic reducing agent.

In testimony, that I claim the foregoing as my invention, I have signed my name this 29th day of March 1926.

ALEXANDER WINOGRADOFF.